(12) United States Patent
Motohashi et al.

(10) Patent No.: US 11,411,288 B2
(45) Date of Patent: Aug. 9, 2022

(54) BATTERY PACK

(71) Applicant: Marelli Corporation, Saitama (JP)

(72) Inventors: Toshiyuki Motohashi, Saitama (JP); Takayuki Hirase, Saitama (JP)

(73) Assignee: Marelli Corporation, Saitama (JP)

( * ) Notice: Subject to any disclaimer, the term of this patent is extended or adjusted under 35 U.S.C. 154(b) by 87 days.

(21) Appl. No.: 16/753,516

(22) PCT Filed: Oct. 2, 2018

(86) PCT No.: PCT/JP2018/036929
§ 371 (c)(1),
(2) Date: Apr. 3, 2020

(87) PCT Pub. No.: WO2019/069945
PCT Pub. Date: Apr. 11, 2019

(65) Prior Publication Data
US 2020/0259156 A1   Aug. 13, 2020

(30) Foreign Application Priority Data
Oct. 3, 2017   (JP) .............................. JP2017-193814

(51) Int. Cl.
H01M 50/20   (2021.01)
H01M 50/54   (2021.01)

(52) U.S. Cl.
CPC ........... *H01M 50/54* (2021.01); *H01M 50/20* (2021.01); *H01M 2220/20* (2013.01)

(58) Field of Classification Search
CPC .. H01M 50/54; H01M 50/20; H01M 2220/20; H01M 50/502; Y02E 60/10
See application file for complete search history.

(56) References Cited

U.S. PATENT DOCUMENTS

| 9,269,934 B2 | 2/2016 | Yang et al. |
| 2003/0031920 A1* | 2/2003 | Hoffman .............. H01M 50/112 429/66 |

(Continued)

FOREIGN PATENT DOCUMENTS

| DE | 102013021549 | * | 6/2015 | .......... H01M 10/655 |
| DE | 102013021639 | * | 6/2015 | ........ H01M 10/6554 |

(Continued)

OTHER PUBLICATIONS

Machine English translation of WO 2006/059434 (Year: 2006).*

(Continued)

*Primary Examiner* — Michael L Dignan
(74) *Attorney, Agent, or Firm* — Young Basile Hanlon & MacFarlane, P.C.

(57) ABSTRACT

A battery pack includes stacked battery cells, each battery cell including a first outer surface having an electrode tab protruding therefrom and a second outer surface that is a side surface intersecting the first outer surface, and a first case that surrounds the battery cells along the first outer surface and the second outer surface. An opening exposing the electrode tab is formed in the first case. The opening includes an inner surface that faces a side surface of all of the electrode tabs exposed through the opening and that is capable of abutting against the electrode tabs when the battery cells are inserted in the first case.

20 Claims, 11 Drawing Sheets

(56) References Cited

U.S. PATENT DOCUMENTS

| | | | | |
|---|---|---|---|---|
| 2007/0281208 A1* | 12/2007 | Yoon | .................... | H01M 50/529 |
| | | | | 429/176 |
| 2015/0037642 A1* | 2/2015 | Pinon | .................... | H01M 50/20 |
| | | | | 429/99 |
| 2018/0190952 A1* | 7/2018 | Kim | ...................... | H01M 50/20 |
| 2019/0189979 A1* | 6/2019 | Choi | ................. | H01M 10/0472 |
| 2019/0341594 A1* | 11/2019 | Morisato | ............. | H01M 50/507 |

FOREIGN PATENT DOCUMENTS

| | | | |
|---|---|---|---|
| JP | 2011023268 A | 2/2011 | |
| JP | 5154454 B2 | 2/2013 | |
| WO | 2006059434 A1 | 6/2006 | |
| WO | WO 2006059434 * | 6/2006 | .............. H01M 2/10 |

OTHER PUBLICATIONS

International Preliminary Report on Patentability dated Apr. 8, 2020 of International Application No. PCT/JP2018/036929.

Office Action of corresponding application JP 2017-193814; dated Oct. 23, 2018; 3 pages.

Office Action of corresponding Chinese Patent Application No. 201880064174.0; dated Dec. 29, 2021; 9 pages.

* cited by examiner

BATTERY PACK

CROSS-REFERENCE TO RELATED APPLICATION

The present application is a 371 application of International Patent Application Serial No. PCT/JP2018/036929, filed Oct. 2, 2018, which claims priority to and the benefit of Japanese Patent Application No. 2017-193814 filed Oct. 3, 2017, the entire contents of which are incorporated herein by reference.

TECHNICAL FIELD

The present disclosure relates to a battery pack.

BACKGROUND

A chargeable/dischargeable battery module that includes a plurality of battery cells is known. For example, patent literature JP5154454B2 discloses a battery module in which a plurality of battery cells are arranged inside an upper frame and lower frame that are joined together.

SUMMARY

In the battery module disclosed in JP5154454B2, however, the battery cells are attached to the lower frame after the electrode tabs of adjacent battery cells among the stacked plurality of battery cells are welded together. This assembly method might not guarantee sufficient accuracy in terms of electrode tab positioning when the electrode tabs are welded together.

The present disclosure has been conceived from this perspective and aims to provide a battery pack capable of positioning electrode tabs inside a case.

To resolve the aforementioned problem, a battery pack according to an embodiment of the present disclosure includes:

a plurality of battery cells, each battery cell comprising a first outer surface having an electrode tab protruding therefrom and a second outer surface that is a side surface intersecting the first outer surface, the battery cells being stacked and connected in series with electrode tabs welded together;

a first case configured to surround the plurality of battery cells along the first outer surface and the second outer surface; and an insulating member disposed between the electrode tabs of adjacent battery cells;

wherein the first case comprises a protrusion protruding from an outer wall of the first case in a protruding direction of the electrode tab;

wherein the protrusion comprises an opening, exposing the electrode tab, and an inner surface formed on the opening; and wherein the inner surface is configured to face a side surface of each electrode tab exposed through the opening and is configured to regulate movement of the battery cell in a direction intersecting the protruding direction of the electrode tab by abutting against the side surface.

A battery pack according to an embodiment of the present disclosure can position electrode tabs inside a case.

DETAILED DESCRIPTION

Embodiments of the present disclosure are described below with reference to the attached drawings. The front-back, left-right, and up-down directions in the description below take the directions of the arrows in the figures as a reference. The stacking direction of the plurality of battery cells 10 in the example below is the up-down direction, but this example is not limiting. The stacking direction of the plurality of battery cells 10 may match any other direction.

First Embodiment

Figure 1:
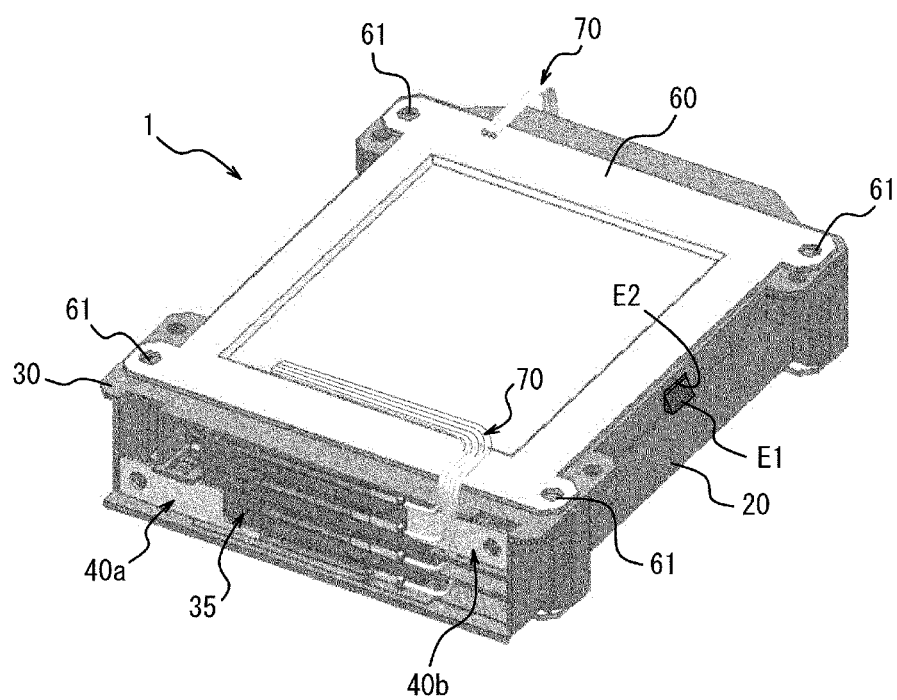
FIG. 1 is a perspective view from the top illustrating the appearance of a battery pack according to a first embodiment of the present disclosure.
Figure 1:
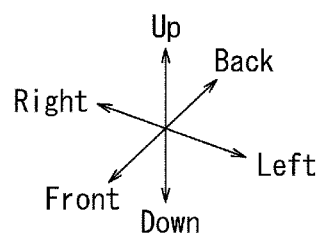
Figure 2:
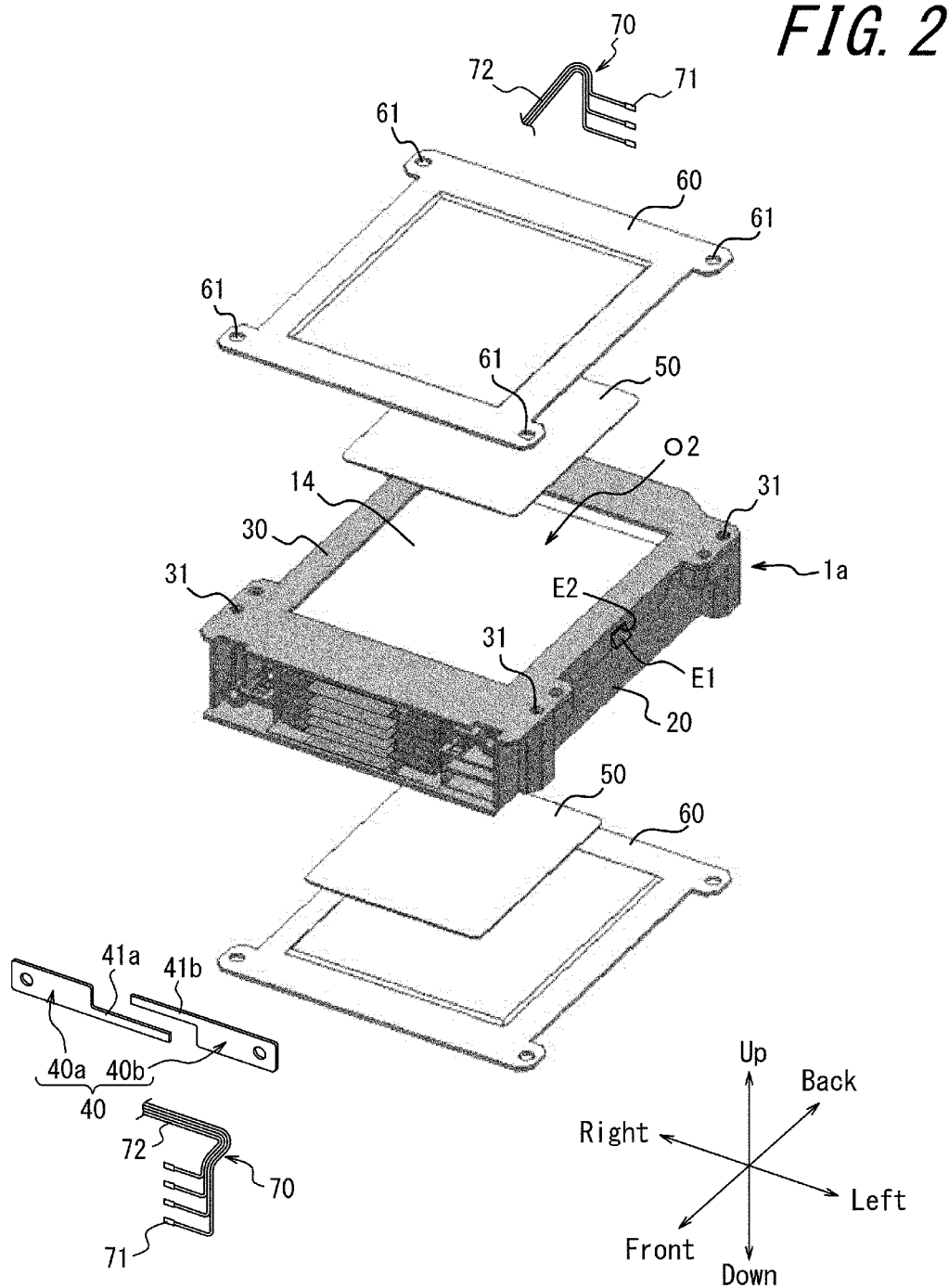
FIG. 2 is an exploded perspective view from the top illustrating a portion of the battery pack in FIG. 1.
Figure 3:
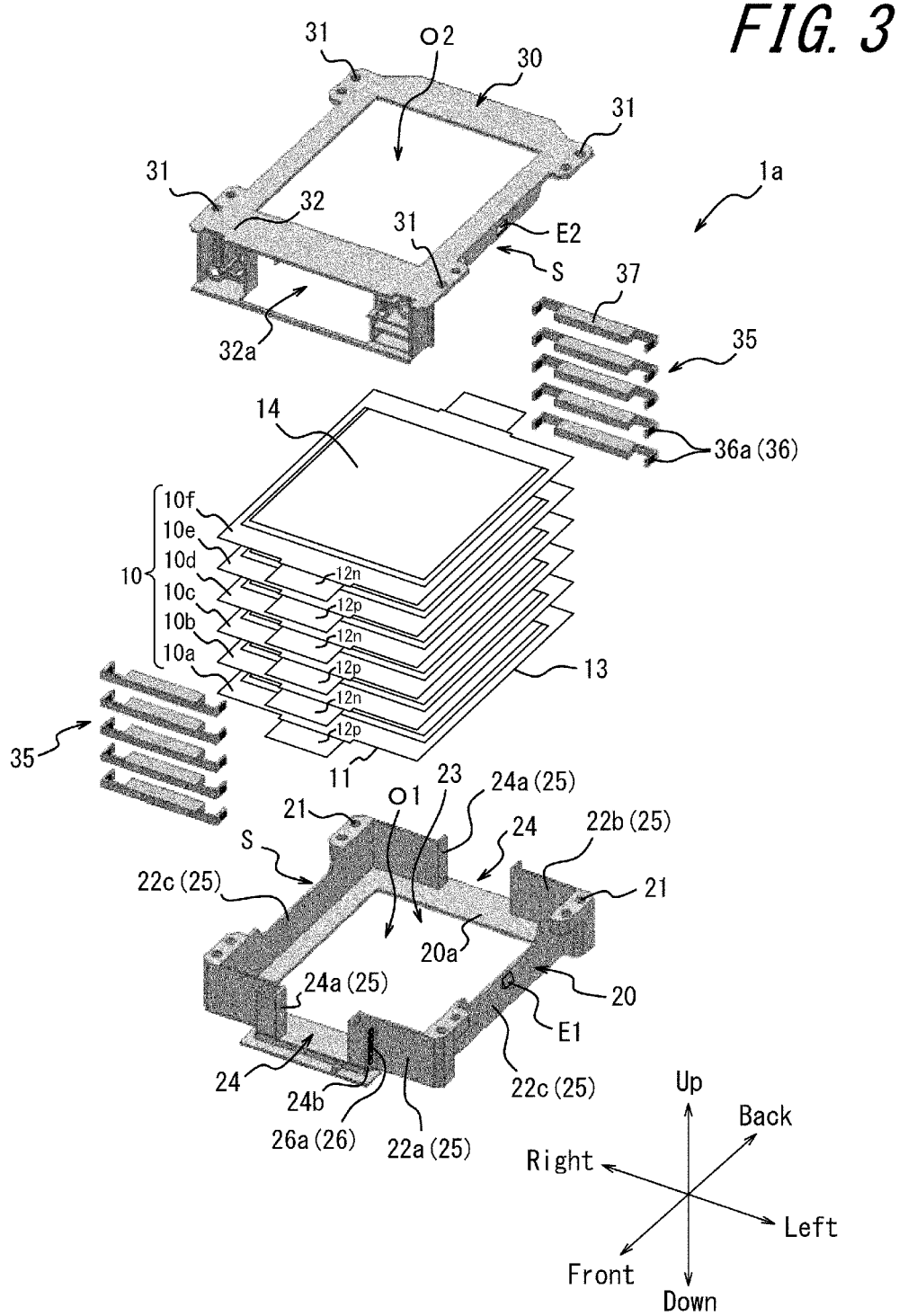
FIG. 3 is an exploded perspective view of each component of the body of the battery pack in FIG. 2.

FIG. 1 is a perspective view from the top illustrating the appearance of a battery pack 1 according to a first embodiment of the present disclosure. FIG. 2 is an exploded perspective view from the top illustrating a portion of the battery pack 1 in FIG. 1. FIG. 3 is an exploded perspective view of each component of the body 1a of the battery pack 1 in FIG. 2. The battery pack 1 includes the body 1a, a bus bar 40, insulating sheets 50, restraining plates 60, and a voltage detector 70 as major constituent elements. The body 1a includes six battery cells 10, a first case 20, a second case 30, and insulating members 35.

As illustrated in FIG. 3, the six battery cells 10 are stacked in the up-down direction. The six stacked battery cells 10 are referred to below as the battery cells 10a, 10b, 10c, 10d, 10e, 10f in order from bottom to top. The battery cells are referred to collectively as battery cells 10 when no distinction therebetween is made. Each battery cell 10 has two first outer surfaces 11 formed by a front surface and a back surface that are substantially parallel in the up-down direction. Each battery cell 10 has one pair of electrode tabs 12p and 12n that protrude in opposite directions from the two first outer surfaces 11 in a direction substantially perpendicular to the stacking direction, in particular in the front-back direction. Each battery cell 10 is stacked with the pair of electrode tabs 12p and 12n aligned in the front-back direction.

The battery cell 10 has two second outer surfaces 13 formed by two side surfaces in the left-right direction that intersect the first outer surfaces 11. The battery cell 10 has two third outer surfaces 14 that intersect the first outer surfaces 11 and the second outer surfaces 13. The two third outer surfaces 14 are formed by the upper surface and lower surface of the battery cell 10 and intersect an axis extending in the stacking direction, i.e. the vertical axis.

The first case 20 and the second case 30 may be made of any highly rigid material, such as a resin material or a metal material provided with an electrically insulating material, such as PET resin, on the surface thereof.

The first case 20 and the second case 30 are divided by a surface S that intersects the axis extending in the stacking direction of the battery cells 10, i.e. the vertical axis. The first case 20 surrounds the battery cells 10 along the first outer surfaces 11 and the second outer surfaces 13 of the battery cells 10. The second case 30 sandwiches the plurality of battery cells 10 between the first case 20 and the second case 30 in the stacking direction of the battery cells 10. The first case 20 and the second case 30 engage with each other to cover the first outer surfaces 11 of the battery cells 10 and support the stacked battery cells 10 therein. The stacked battery cells 10 are mounted on a bottom surface 20a of the first case 20. When the first case 20 and the second case 30 are engaged, the first case 20 has an opening O1 formed on the bottom surface, and the second case 30 has an opening O2 formed on the top surface. The surfaces of the first case 20 and the second case 30 that are connected to each other, i.e. the surfaces S, are substantially parallel to the third outer surfaces 14 of the battery cells 10. In this way, the first case 20 and the second case 30 are engaged or separated in the up-down direction.

The first case 20 and the second case 30 may be engaged by an engaging claw E1 formed on a side surface of one case and an engaging hole E2 formed on the corresponding side surface of the other case. The engaging claw E1 engages with the engaging hole E2 when the first case 20 and the second case 30 are engaged. The battery pack 1 is not limited to a configuration engaged by a claw and hole. For example, the first case 20 and the second case 30 may be engaged by arbitrary protrusions, which protrude from the respective side surfaces, being clamped by an elastic member, such as a clip. The first case 20 and the second case 30 may be engaged by any fastening structure, such as screwing. In this way, the battery pack 1 may have any engaging structure that allows the first case 20 and the second case 30 to be engaged reliably. The battery pack 1 is therefore easy to assemble, which can contribute to improving product reliability.

The insulating members 35 are made of a resin material or a metal material provided with an electrically insulating material, such as PET resin, on the surface thereof. The insulating members 35 are formed to be substantially U-shaped. The insulating members 35 insulate the electrode tabs 12p and 12n of adjacent battery cells 10 among the plurality of battery cells 10 housed in the first case 20 and the second case 30. The insulating members 35 each include an engaging portion 36 that engages with the first case 20, for example. The engaging portion 36 may, for example, be configured by engaging holes 36a formed on opposite ends. The insulating members 35 each include an abutting portion 37, formed in the central area thereof, that abuts against the electrode tabs 12p and 12n of the battery cells 10.

As illustrated in FIG. 2, the bus bar 40 has a total plus bus bar 40a and a total minus bus bar 40b. The bus bar 40 is formed in the shape illustrated in FIG. 2 by a metal such as aluminum or copper. The total plus bus bar 40a is connected to the electrode tab 12p of the battery cell 10a. The total minus bus bar 40b is connected to the electrode tab 12n of the battery cell 10f.

The insulating sheets 50 are formed as a substantially flat plate by an electrically insulating material such as polyethylene (PE) or polypropylene (PP) resin. One insulating sheet 50 is disposed to abut against the upper surface of the battery cell 10f positioned at the top of the stacked battery cells 10. Similarly, another insulating sheet 50 is disposed to abut against the lower surface of the battery cell 10a positioned at the bottom of the stacked battery cells 10. The insulating sheets 50 are provided to secure electrical insulation between the restraining plates 60 fixed to the upper and lower surfaces of the battery pack 1 and the battery cells 10 inside the battery pack 1.

The restraining plates 60 are made of any highly rigid material. For example, the restraining plates 60 may be made exclusively of a metal material. This example is not limiting, and the restraining plates 60 may be made of a resin material or a metal material provided with an electrically insulating material, such as PET resin, on the surface thereof. The restraining plates 60 are formed as a substantially flat plate.

The restraining plates 60 are disposed to abut against the upper and lower surfaces of the insulating sheet 50 at the upper and lower surfaces of the battery pack 1. The restraining plates 60 are fixed to the upper and lower surfaces of the engaged first case 20 and second case 30 by a suitable method, such as screwing. For example, screws may be inserted into holes 61 that are provided at the four corners of the restraining plate 60 and aligned with four screw holes 21 provided at both front and back edges on the side surfaces of the first case 20 and four screw holes 31 provided at the four corners on the upper surface of the second case 30. The restraining plates 60 are thereby fixed to the upper and lower surfaces of the engaged first case 20 and second case 30. The restraining plates 60 clamp the battery cells 10 between the first case 20 and the second case 30 in a state that restrains the two third outer surfaces 14 that are formed by the upper and lower surfaces of the battery cells 10 and that intersect the axis extending in the stacking direction. At the same time, the restraining plates 60 support the battery cells 10.

The voltage detector 70 is formed by a terminal plate 71 for detecting the voltage of the battery cell 10 and a wire 72 for transmitting the detected voltage signal. The voltage detector 70 is connected to the corresponding electrode tab of the battery cell 10.

Figure 4A:
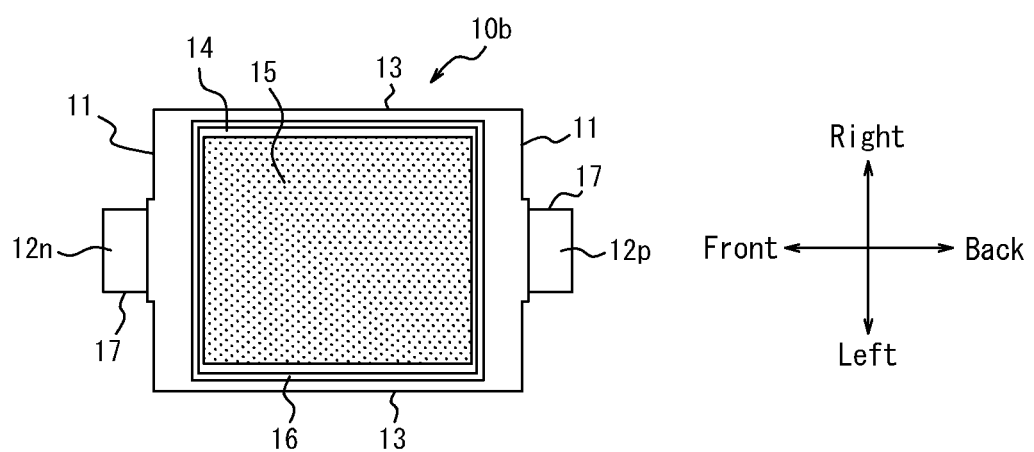
FIG. 4A is a top view of a battery cell.
Figure 4B:
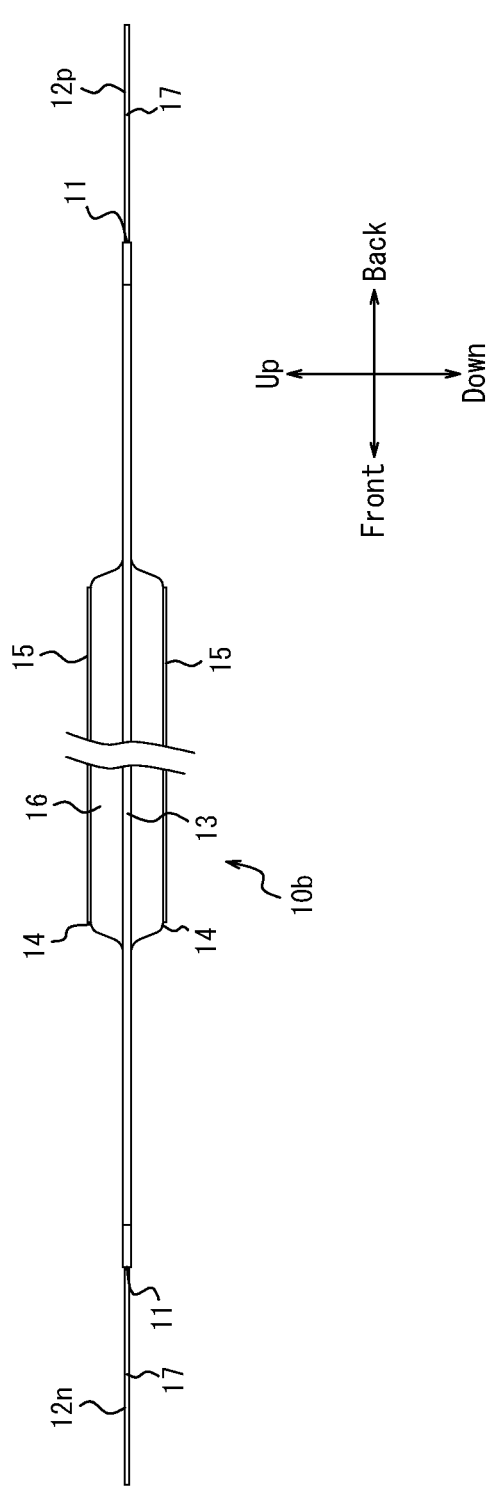
FIG. 4B is a side view of a battery cell.

FIGS. 4A and 4B illustrate only the battery cell 10 of FIG. 3. FIG. 4A is a top view of the battery cell 10. FIG. 4B is a side view of the battery cell 10. As an example, FIGS. 4A and 4B illustrate the battery cell 10b disposed as in FIG. 3. The other battery cells 10 are also configured similarly to the battery cell 10b illustrated in FIGS. 4A and 4B.

The battery cell 10 is formed as a substantially flat plate when viewed from the top. An exterior member 16 of the battery cell 10 is formed by a laminated film. The outermost layer of the exterior member 16 is made of resin to secure electrical insulation. The upper and lower surfaces of the exterior member 16 form the third outer surfaces 14. The first outer surfaces 11 protrude one step farther outward in the central region than at the left and right edges. The first outer surfaces 11 are formed to be convex when viewed from the top. The electrode tab 12p or 12n protrudes from the portion of the first outer surface 11 that protrudes one step outward. The electrode tabs 12p and 12n protrude substantially in parallel with the front-back direction and have side surfaces 17 along the protruding direction. The electrode tabs 12p and 12n normally protrude as flat plates, as illustrated in FIGS. 4A and 4B. During the below-described assembly process of the battery pack 1, however, the electrode tabs 12p and 12n are symmetrically bent towards the outside to be substantially L-shaped, when viewed from the side, in order to contact the electrode tab 12p or 12n of another battery cell 10 adjacent in the up-down direction or the bus bar 40. For example, the electrode tab 12p protrudes linearly outward along the front-back direction and then bends downwards. The electrode tab 12n protrudes linearly outward along the front-back direction and then bends upwards. In the example below, the electrode tab 12p bent downwards is a positive electrode terminal, and the electrode tab 12n bent upwards is a negative electrode terminal, but this example is not limiting. The electrode tabs 12p and 12n may be configured so that the positive electrode and negative electrode roles are reversed.

The battery cell 10 may include an adhesive layer 15 provided on the two third outer surfaces 14 to adhere adjacent battery cells 10 to each other. The adhesive layer 15 may be provided on just one of the upper and lower two third outer surfaces 14. The adhesive layer 15 may be made of an adhesive such as a bonding agent or double-sided tape. For example, adjacent battery cells 10 may be adhesively fixed to each other by any method, such as applying a bonding agent to the upper surface and lower surface of each battery cell 10. Similarly, the battery cells 10 and the insulating sheets 50 may be adhesively fixed to each other by adhesive. The insulating sheets 50 and restraining plates 60 may also similarly be adhesively fixed to each other by adhesive.

Figure 5:
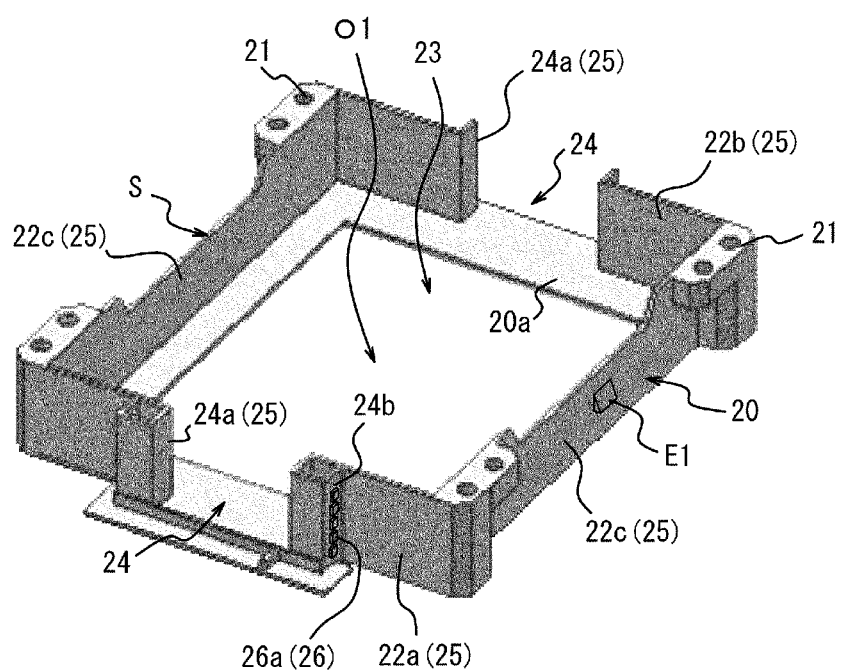
FIG. 5 is a perspective view from the top illustrating only the first case of FIG. 3.
Figure 5:
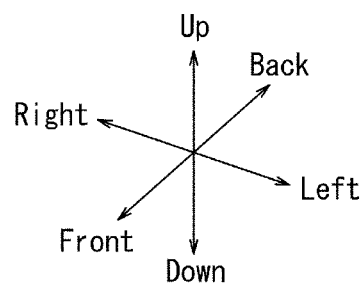

FIG. 5 is a perspective view from the top illustrating only the first case 20 of FIG. 3.

The first case 20 has a front wall 22a, a back wall 22b, and side walls 22c that protrude upward from the bottom surface 20a. The first case 20 has a housing portion 23 surrounded by the front wall 22a, the back wall 22b, and the side walls 22c. The first case 20 has first openings 24 formed in the front wall 22a and the back wall 22b. The first openings 24 are formed by cutting out the substantially central region of the front wall 22a and the back wall 22b to the bottom surface 20a. The first case 20 has an abutting portion 25 formed by an inner surface 24a of the first opening 24. The first case 20 has an engaging portion 26 formed on an outer surface 24b of the first opening 24.

When the battery cells 10 are inserted in the first case 20, the electrode tabs 12p and 12n of each battery cell 10 are guided inside the first case 20 along the first openings 24. The housing portion 23 houses the stacked battery cells 10 when the battery cells 10 are inserted in the first case 20. At this time, the electrode tabs 12p and 12n of the battery cell 10 protrude outward from the first openings 24. The electrode tabs 12p and 12n are exposed through the first openings 24. The abutting portion 25 abuts against the electrode tabs 12p and 12n of the battery cell 10. In particular, the abutting portion 25 is formed by the inner surfaces 24a facing the side surfaces 17 that extend along the protruding direction of the electrode tabs 12p and 12n, i.e. the front-back direction. The abutting portion 25 abuts against the side surfaces 17 when the battery cell 10 is inserted. In this way, the inner surfaces 24a of the first opening 24 face the side surfaces 17 of all of the electrode tabs 12p and 12n exposed through the first opening 24 and can abut against the electrode tabs 12p and 12n when the battery cell 10 has been inserted in the first case 20. The abutting portion 25 may abut against at least one of the electrode tabs 12p and 12n. The abutting portion 25 may simultaneously abut against the side surfaces 17 on both the left and right sides of the electrode tab 12p or 12n or against only one of the side surfaces 17.

The abutting portion 25 may further abut against the second outer surfaces 13 of the battery cell 10 when the battery cell 10 is inserted. The abutting portion 25 may be configured by the side walls 22c that face the second outer surfaces 13 when the battery cell 10 is inserted. In this case, the second outer surfaces 13 of the battery cell 10 abut against the abutting portion 25 of the first case 20, in particular the side walls 22c, upon the battery cell 10 being inserted in the first case 20. The abutting portion 25 may simultaneously abut against the second outer surfaces 13 on both the left and right sides or against only one of the second outer surfaces 13.

In this way, each battery cell 10 is positioned in the left-right direction by the corresponding portion being abutted against the abutting portion 25 of the first case 20, using the electrode tab 12p or 12n as a reference. The abutting portion 25 forms a portion of the first opening 24, where the electrode tab 12p or 12n is housed, in the first case 20. By the abutting portion 25 abutting against the side surfaces 17 of the electrode tab 12p or 12n, the battery pack 1 allows accurate positioning, in the left-right direction, of the electrode tabs 12p and 12n of adjacent battery cells 10 when these tabs are welded together. As described above, each battery cell 10 may be positioned in the left-right direction using the side surfaces 17 of at least one of the electrode tabs 12p and 12n as a reference.

The abutting portion 25 may further abut against the first outer surfaces 11 of the battery cell 10 when the battery cell 10 is inserted. The abutting portion 25 may be configured by the front wall 22a or the back wall 22b that face the first outer surfaces 11 when the battery cell 10 is inserted. The front wall 22a or the back wall 22b of the first case 20 can abut against all of the first outer surfaces 11 of the plurality of battery cells 10. In this case, the first outer surfaces 11 of the battery cell 10 abut against the abutting portion 25 of the first case 20, in particular the front wall 22a or the back wall 22b, upon the battery cell 10 being inserted in the first case 20. The abutting portion 25 may simultaneously abut against the first outer surfaces 11 on both the front and back sides or against only one of the first outer surfaces 11.

Each battery cell 10 may be positioned in the front-back direction by, for example, a corresponding portion of the first outer surface 11 abutting against the front wall 22a or back wall 22b of the first case 20. The position of each battery cell 10 in the front-back direction may be determined by the first outer surface 11 abutting against the front wall 22a or back wall 22b of the first case 20.

The engaging portion 26 formed on the outer surface 24b of the first opening 24 engages with the engaging portion 36 when the insulating members 35 are fitted into the first openings 24 of the first case 20. The engaging portion 26 may, for example, be configured by an engaging claw 26a formed to protrude from the outer surface 24b of the first opening 24. Five pairs of engaging portions 26 are aligned in the up-down direction along the outer surface 24b at the left and right sides of the first opening 24 in correspondence with the number of insulating members 35.

The second case 30 that engages with the first case 20 is configured to have a shape corresponding to the first case 20, as illustrated in FIG. 3. The second case 30 is substantially L-shaped overall. The second case 30 has a second opening 32a, inside which the entire first opening 24 of the first case 20 is arranged, on a front wall 32.

Figure 6A:
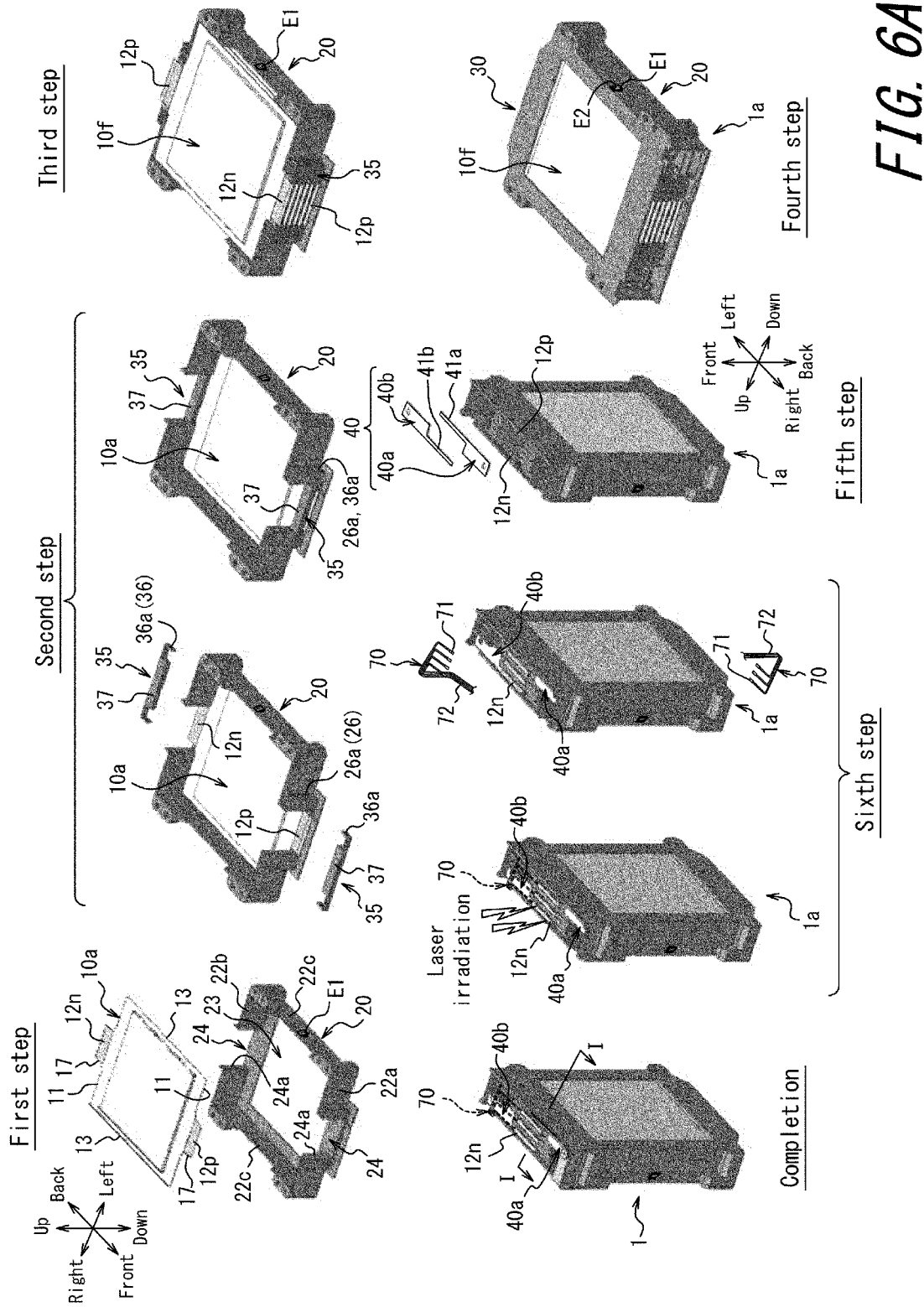
FIG. 6A is a schematic diagram illustrating the steps for assembling the battery pack of FIG. 1.

FIG. 6A is a schematic diagram illustrating the steps for assembling the battery pack 1 of FIG. 1.

In the first step illustrated in FIG. 6A, the battery cell 10a to be housed at the bottommost layer among the six stacked battery cells 10 is inserted in the first case 20. For example, the electrode tab 12p of the battery cell 10a is arranged at the front, and the electrode tab 12n is arranged at the back. The battery cell 10a is guided into the housing portion 23 along the inner surfaces 24a of the first opening 24 or the side walls 22c. Upon the battery cell 10a being inserted into the first case 20, the side surfaces 17 of the electrode tabs 12p and 12n of the battery cell 10a abut against the inner surfaces 24a of the first case 20. The first outer surface 11 of the battery cell 10a abuts against the front wall 22a or the back wall 22b of the first case 20. Similarly, the second outer surfaces 13 of the battery cell 10a may abut against the side walls 22c of the first case 20.

In the second step illustrated in FIG. 6A, the insulating members 35 are inserted in the first case 20 from both the front-back directions so that the abutting portions 37 abut directly above the electrode tabs 12p and 12n of the battery cell 10a. Upon the insulating members 35 being inserted, the abutting portions 37 only abut against the electrode tabs 12p and 12n of the battery cells 10 housed in the first case 20. The engaging holes 36a of the insulating members 35 engage with the engaging claws 26a of the first case 20 when the insulating member 35 is inserted. The battery pack 1 is not limited to such a configuration engaged by a claw and hole. For example, the first case 20 and the insulating members 35 may be engaged by arbitrary protrusions protruding from the respective side surfaces being clamped by an elastic member, such as a clip. The first case 20 and the insulating member 35 may be engaged by any fastening structure, such as screwing. In this way, the battery pack 1 may have any engaging structure that allows the first case 20 and the insulating members 35 to be engaged reliably. The battery pack 1 is therefore easy to assemble, which can contribute to improving product reliability.

In the third step illustrated in FIG. 6A, the battery cells 10b through 10f and the insulating members 35 are alternately inserted from the bottom upwards one at a time into the first case 20. At this time, each battery cell 10 is arranged so that the electrode tabs 12p and 12n face the opposite directions from those of the adjacent battery cell 10. The battery cell 10b is arranged so that the electrode tab 12p faces backward and the electrode tab 12n faces forward. By repetition of a similar arrangement, the battery cell 10f positioned in the uppermost layer is arranged so that the electrode tab 12p faces backward and the electrode tab 12n faces forward. The battery cells 10b through 10f are positioned by abutting against the corresponding portions of the first case 20, like the battery cell 10a.

In the fourth step illustrated in FIG. 6A, the second case 30 is engaged with the first case 20 so as to cover the opposite side of the battery cell 10 from the side inserted into the first case 20. In greater detail, the first case 20 and the second case 30 are engaged by the engaging claw E1 provided on the side surface of the first case 20 being engaged with the engaging hole E2 provided on the side surface of the second case 30.

This completes the assembly of the body 1a of the battery pack 1.

Subsequently, in the fifth step illustrated in FIG. 6A, the bus bar 40 is attached to the front surface of the body 1a. In greater detail, the position of the total plus bus bar 40a at the front surface of the body 1a is adjusted so that an insertion portion 41a of the total plus bus bar 40a is positioned directly below the electrode tab 12p of the battery cell 10a located at the bottommost layer. Similarly, the position of the total minus bus bar 40b at the front side of the body 1a is adjusted so that an insertion portion 41b of the total minus bus bar 40b is positioned directly above the electrode tab 12n of the battery cell 10f located at the uppermost layer. Subsequently, the electrode tabs 12p and 12n protruding substantially in the left-right direction are bent in a predetermined direction. For example, the electrode tabs 12p are bent downwards, and the electrode tabs 12n are bent upwards.

In the sixth step illustrated in FIG. 6A, the voltage detector 70 is attached to the front surface of the body 1a. In greater detail, the terminal plate 71 is superimposed from the front onto the bent electrode tabs 12p and 12n that overlap each other and the bus bars 40 that overlap the bent electrode tab 12p or 12n. In this state, the constituent elements arranged at the front surface of the body 1a of the battery pack 1 are welded together by an appropriate method such as laser welding. The electrode tabs are welded to each other, as are the electrode tabs and bus bars 40, and the electrode tab and terminal plate 71. The same is true for the constituent elements disposed on the back surface of the body 1a of the battery pack 1. At this time, the electrode tabs 12p and 12n of adjacent battery cells 10 are welded together farther outward than the insulating members 35.

This completes the assembly of the battery pack 1 illustrated in FIG. 6A. In this case, the insertion portion 41a of the total plus bus bar 40a and the electrode tab 12p of the battery cell 10a are electrically connected at the front surface of the body 1a. Similarly, the electrode tab 12n of the battery cell 10b and the electrode tab 12p of the battery cell 10c are electrically connected. The electrode tab 12n of the battery cell 10d and the electrode tab 12p of the battery cell 10e are electrically connected. The insertion portion 41b of the total minus bus bar 40b and the electrode tab 12n of the battery cell 10f are electrically connected.

Figure 6B:
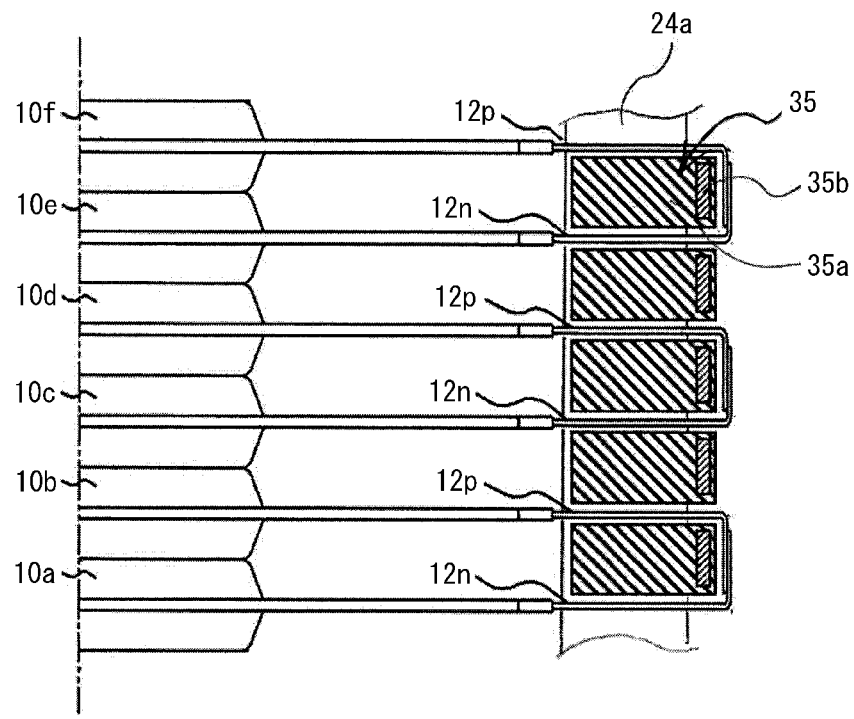
FIG. 6B is a cross-sectional view of a simplified portion of a cross-section along the I-I line of FIG. 6A.

FIG. 6B is a cross-sectional view of a simplified portion of a cross-section along the I-I line of FIG. 6A. FIG. 6B illustrates the back side of the body 1a of the battery pack 1 in FIG. 6A. FIG. 6B illustrates an example in which the insulating member 35 is made of a metal material 35b provided with an electrically insulating material 35a, such as PET resin, on the surface thereof. At the back surface of the body 1a, the electrode tab 12n of the battery cell 10a and the electrode tab 12p of the battery cell 10b are electrically connected. Similarly, the electrode tab 12n of the battery cell 10c and the electrode tab 12p of the battery cell 10d are electrically connected. The electrode tab 12n of the battery cell 10e and the electrode tab 12p of the battery cell 10f are electrically connected. At this time, the insulating member 35 insulates the electrode tabs 12p and 12n of adjacent battery cells 10. For example, the insulating member 35 insulates the electrode tab 12p of the battery cell 10b and the electrode tab 12n of the battery cell 10c. For example, the insulating member 35 insulates the electrode tab 12p of the battery cell 10d and the electrode tab 12n of the battery cell 10e.

By thus being bent in vertically opposite directions, the electrode tabs 12p and 12n of each battery cell 10 are each connected to the electrode tab of opposite polarity of the adjacent battery cell 10. Ultimately, the six battery cells 10 are connected in series.

Figure 7:
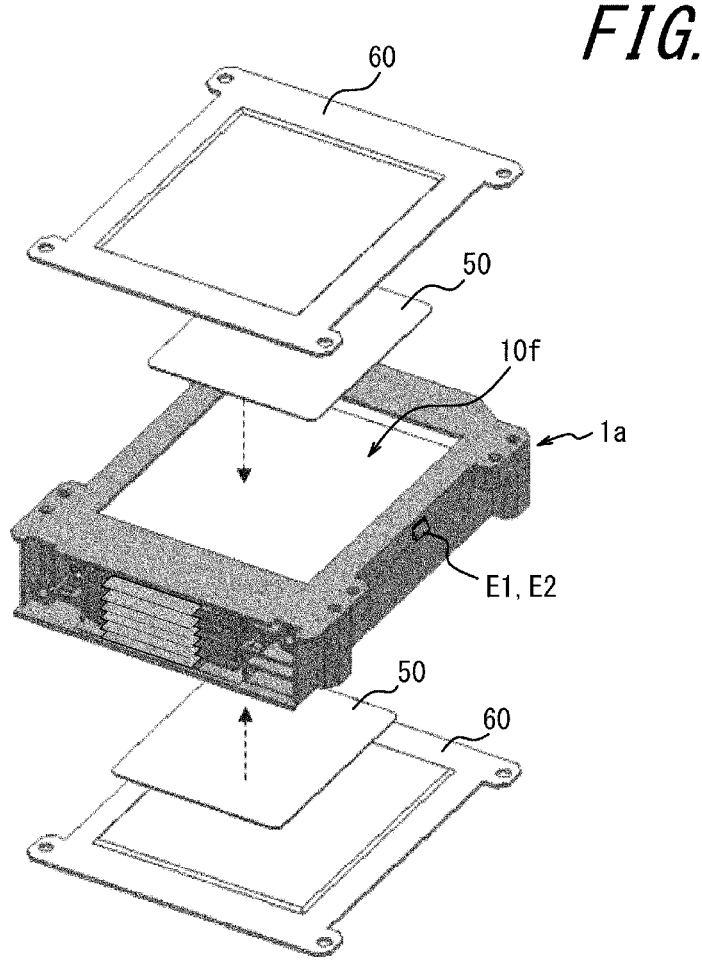
FIG. 7 is a schematic diagram illustrating the steps for attaching insulating sheets and restraining plates to the body of the battery pack in FIG. 1.
Figure 7:
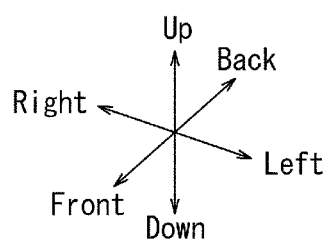

FIG. 7 is a schematic diagram illustrating the steps for attaching the insulating sheets 50 and the restraining plates 60 to the body 1a of the battery pack 1 in FIG. 1.

The insulating sheets 50 and restraining plates 60 are attached to the body 1a at an appropriate timing during the steps illustrated in FIG. 6A. In particular, the insulating sheets 50 and restraining plates 60 are attached to both the upper and lower surfaces of the body 1a. In greater detail, two insulating sheets 50 are attached, one to abut against the upper surface of the battery cell 10f and another to abut against the lower surface of the battery cell 10a. Two restraining plates 60 are attached, one to abut against the upper surface and the other to abut against the lower surface of the insulating sheets 50 disposed on the top and bottom. This completes the assembly of the battery pack 1 illustrated in FIG. 1.

The above battery pack 1 according to the first embodiment can improve ease of assembly. By the battery pack 1 including the first opening 24, one battery cell 10 at a time can be inserted in the first case 20 without bending or welding the electrode tabs 12p and 12n. The battery cells 10 are thereby positioned in the first case 20, and the position of the electrode tabs 12p and 12n are further adjusted through the first opening 24, to facilitate positioning when adjacent electrode tabs 12p and 12n are welded together. Consequently, the accuracy of this positioning improves. It also becomes simple to house the battery cells 10 in the first case 20.

In the battery pack 1, the side surfaces 17 of the electrode tab 12p or 12n become the reference for positioning. The electrode tabs 12p and 12n of adjacent battery cells 10 can therefore be welded together after being accurately positioned. In this way, the battery pack 1 enables the electrode tabs 12p and 12n to be positioned more accurately at the time of welding than when the reference for positioning and the portion to be welded are disposed on outer surfaces in different directions of the battery cell.

In particular, the abutting portion 25 is the inner surface 24a of the first opening 24 of the first case 20 in the battery pack 1. This enables the entire side surfaces 17 of the electrode tab 12p or 12n that becomes the reference for positioning to be received and the battery cell 10 to be stably arranged. The positioning accuracy of the electrode tabs 12p and 12n is thereby further increased at the time of welding. The battery pack 1 can thus simplify the welding process of the electrode tabs 12p and 12n and facilitate welding operations. Consequently, the battery pack 1 can contribute to improving product reliability.

The battery pack 1 can further improve the positioning accuracy of the electrode tabs 12p and 12n by the abutting portion 25 abutting against the first outer surface 11 of the battery cell 10. In particular, the battery pack 1 allows more accurate positioning in the front-back direction.

The battery pack 1 can, in particular, further improve positioning accuracy of the electrode tabs 12p and 12n by the abutting portion 25 being configured by the front wall 22a or the back wall 22b of the first case 20. When the battery cells 10 are inserted, the battery pack 1 allows the first outer surfaces 11 to be reliably abutted against the front wall 22a or the back wall 22b, which is part of the abutting portion 25. In particular, substantially the entire region of the first outer surface 11 in the left-right direction of the battery cell 10 abuts against the front wall 22a or the back wall 22b. The battery pack 1 can thereby provide a reference for positioning over a wide region. Consequently, the battery pack 1 can reliably align the positions of the electrode tabs 12p and 12n across different battery cells 10 if the dimensions of each battery cell 10 are the same.

By provision of the insulating members 35 in the battery pack 1, electrical insulation can be secured between adjacent battery cells 10 in the stacking direction. In addition to the initial state, insulation can also be maintained if the battery cells 10 swell due to deterioration over time, changing the position of the electrode tabs 12p and 12n in the up-down direction. The battery pack 1 prevents short-circuiting at the time of attachment and enables safe attachment.

The battery pack 1 includes the abutting portions 37 and can thereby more reliably insulate only the electrode tabs 12p and 12n. In the battery pack 1, the abutting portions 37 only abut against the electrode tabs 12p and 12n of the battery cells 10. Insulation of the electrode tabs 12p and 12n can therefore be secured without affecting the other constituent elements.

The battery pack 1 is easy to assemble by virtue of the engaging structure formed by the engaging portions 26 of the first case 20 and the engaging portions 36 of the insulating members 35. The battery pack 1 can thereby contribute to improving product reliability. In particular, the battery pack 1 more notably achieves these effects when the combination of engaging claws 26a and engaging holes 36a is provided.

The battery pack 1 can secure electrical insulation between electrode tabs by the insulating member 35 being made of a resin material or a metal material provided with an electrically insulating material on the surface thereof.

By the battery cells 10 being fixed together, the battery cells 10 and the insulating sheets 50 being fixed together, and the insulating sheets 50 and restraining plates 60 being fixed together by adhesive in the battery pack 1, the resistance of the battery pack 1 to vibration or shock can be improved. For example, when the battery pack 1 is mounted in a vehicle, the relative displacement between components due to vibration, shock, or the like when the vehicle is moving can be prevented. In this way, the components inside the battery pack 1 are firmly fixed to each other to prevent damage to the internal components from vibration or shock.

The first case 20 and the second case 30 in the battery pack 1 are made of a resin material or a metal material provided with an electrically insulating material on the surface thereof. Electrical insulation can thereby be secured between external components, such as electrical components, and the battery cells 10 inside the battery pack 1.

The battery pack 1 is easy to assemble by virtue of the arbitrary engaging structure, in particular the combination of the engaging claw E1 and the engaging hole E2. The battery pack 1 can thereby contribute to improving product reliability.

The third outer surface 14 substantially perpendicular to the stacking direction of the battery cells 10 is restrained by the restraining plates 60 in the battery pack 1. Swelling in the stacking direction of the battery cells 10 can thereby be suppressed if an internal gas is produced during use of the battery pack 1, during charging/discharging, or by deterioration over time. When the restraining plates 60 are made of a metal material, the rigidity thereof increases, and the battery pack 1 can effectively suppress swelling of the battery cells 10. The electrical insulation in the battery pack 1 can also be further improved by forming the restraining plates 60 from a metal material coated with an electrically insulating material or a resin material, like the first case 20 and the second case 30. In this case, the restraining plates 60 can be reduced in weight, and the battery pack 1 can be manufactured at a low cost. This contributes to a reduction in weight and cost of the battery pack 1 itself.

The battery cells 10 in the battery pack 1 are restrained from both the upper and lower sides by the restraining plates 60. The battery cells 10 are therefore firmly restrained in the up-down directions. Pressure retention improves by the highly rigid restraining plates 60 sandwiching the stacked battery cells 10 both from above and below. Accordingly, the battery pack 1 can further suppress swelling in the stacking direction of the battery cells 10. Similarly, the battery pack 1 can improve support of the stacked battery cells 10. The battery pack 1 can regulate the position of each battery cell 10 in the up-down direction. As a result of the restraint in the up-down direction, the first case 20 and the second case 30 tend not to warp even when supporting the stacked battery cells 10. In other words, warping of the first case 20 and the second case 30 is regulated by the upper and lower restraining plates 60.

The battery pack 1 can further improve the positioning accuracy of the electrode tabs 12p and 12n by the abutting portion 25 further abutting against the second outer surface 13 of the battery cell 10. In particular, the battery pack 1 allows more accurate positioning in the left-right direction.

The battery pack 1 can, in particular, further improve positioning accuracy of the electrode tabs 12p and 12n by the abutting portion 25 being configured by the side walls 22c of the first case 20. When the battery cells 10 are inserted, the battery pack 1 allows the second outer surfaces 13 to be reliably abutted against the side walls 22c, which are a part of the abutting portion 25. In particular, substantially the entire region of the second outer surfaces 13 in the front-back direction of the battery cell 10 abut against the side walls 22c. The battery pack 1 can thereby provide a reference for positioning over a wide region. Consequently, the battery pack 1 can reliably align the positions of the electrode tabs 12p and 12n across different battery cells 10 if the dimensions of each battery cell 10 are the same.

Only the first case 20 in the battery pack 1 includes the housing portion 23 and the first openings 24. These structures can thereby be concentrated in one of the cases, improving production efficiency. The housing portion 23 and the first openings 24 can be formed collectively in the first case 20 of the battery pack 1. This enables a reduction in the number of manufacturing steps and contributes to improving productivity.

The battery pack 1 has improved ease of insertion of the battery cells 10 into the first case 20 by the first case 20 including the first openings 24. The battery pack 1 can prevent the electrode tabs 12p and 12n from coming into contact with the first case 20 and deforming at the time of insertion and can reliably house the electrode tabs 12p and 12n in the first openings 24. In this way, the battery pack 1 enables safe and reliable attachment without damaging the electrode tabs 12p and 12n.

The battery pack 1 can suppress deterioration of the first case 20 and the second case 30 by including the openings O1 and O2. If the openings O1 and O2 were omitted, and the restraining plates 60 were provided directly on the upper surface of the first case 20 and the lower surface of the second case 30, then the restraining plates 60 would apply pressure directly on these cases, causing the cases to deform and accelerating deterioration. Accordingly, the battery pack 1 can prevent damage to the case due to such degradation over time.

By the arrangement of the insulating sheets 50, the battery pack 1 can secure electrical insulation between the restraining plates 60 and the internal battery cells 10.

The electrode tabs 12p and 12n of the battery cells 10 protrude in opposite directions in the front-back direction in the battery pack 1 and are therefore shaped symmetrically. This improves the symmetry of the first case 20. The battery pack 1 enables balanced formation of the first case 20.

Second Embodiment

Figure 8:
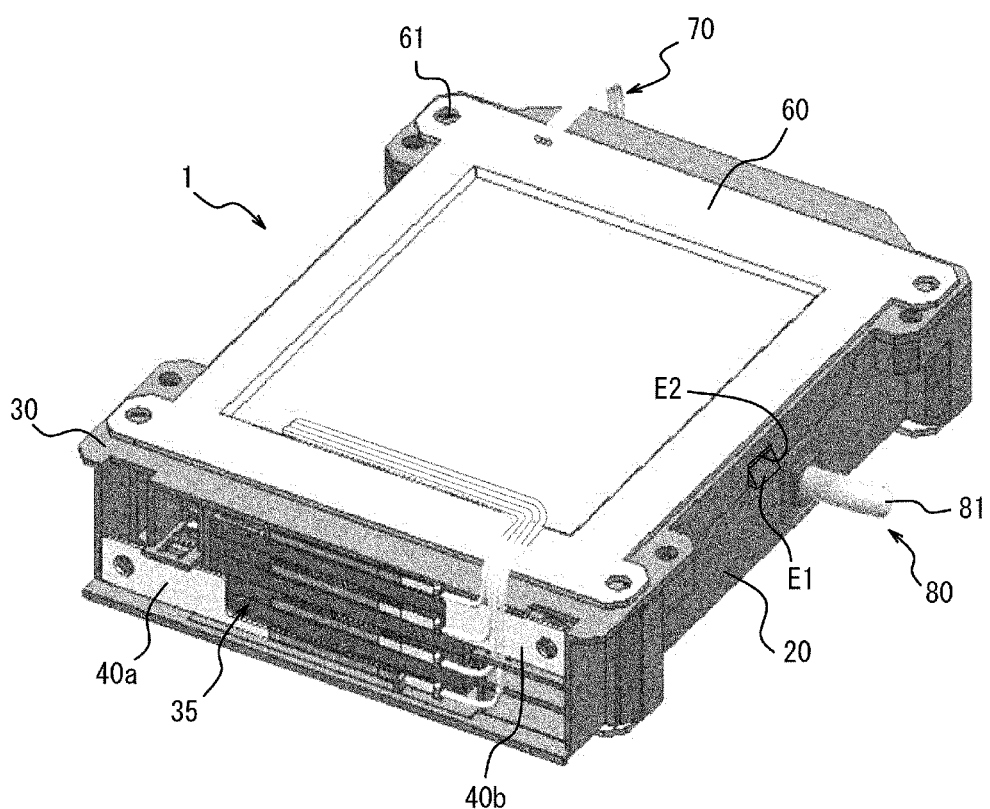
FIG. 8 is a perspective view from the top illustrating the appearance of a battery pack according to a second embodiment of the present disclosure.
Figure 8:
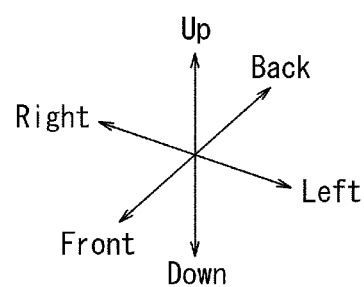

FIG. 8 is a perspective view from the top illustrating the appearance of a battery pack 1 according to a second embodiment of the present disclosure. As illustrated in FIG. 8, the battery pack 1 according to the second embodiment has the configuration of the battery pack 1 according to the first embodiment, with the addition of a discharge portion 80 for discharging gas produced inside the battery cells 10 to the outside. The configuration that is the same as in the first embodiment is labeled with the same reference signs below. A description of this configuration is omitted to focus mainly on the discharge portion 80, which differs from the first embodiment.

One discharge portion 80 is provided on a side surface of the first case 20, for example. The discharge portion 80 has a discharge tube 81 extending to the outside from this side surface. The discharge portion 80 may be provided on any outer surface of the first case 20 and the second case 30, as long as internal gas can efficiently be discharged to the outside. The present embodiment is not limited to including only one discharge portion 80 and may include a plurality thereof.

Gas is produced inside the battery cells 10 along with deterioration over time. If the pressure of the internal gas exceeds a predetermined value, the internal gas is released to the outside from the surrounding edges of the battery cells 10. The discharge portion 80 guides the internal gas released from the battery cells 10 through the discharge tube 81 to the outside of the battery pack 1.

The above battery pack 1 according to the second embodiment achieves similar effects to those described in the first embodiment. Additionally, the battery pack 1 according to the second embodiment increases safety by guiding the internal gas outside through the discharge portion 80. In other words, the battery pack 1 can improve product reliability.

It will be apparent to a person of ordinary skill in the art that the present disclosure can be embodied in forms other than the above embodiment without departing from the spirit or essential features of the present disclosure. Accordingly, the description above is only a non-limiting example. The scope of the present disclosure is defined not by the description above, but by the appended claims. Among all possible modifications, the modifications within the range of equivalents are to be considered encompassed by the claims.

Figure 9:
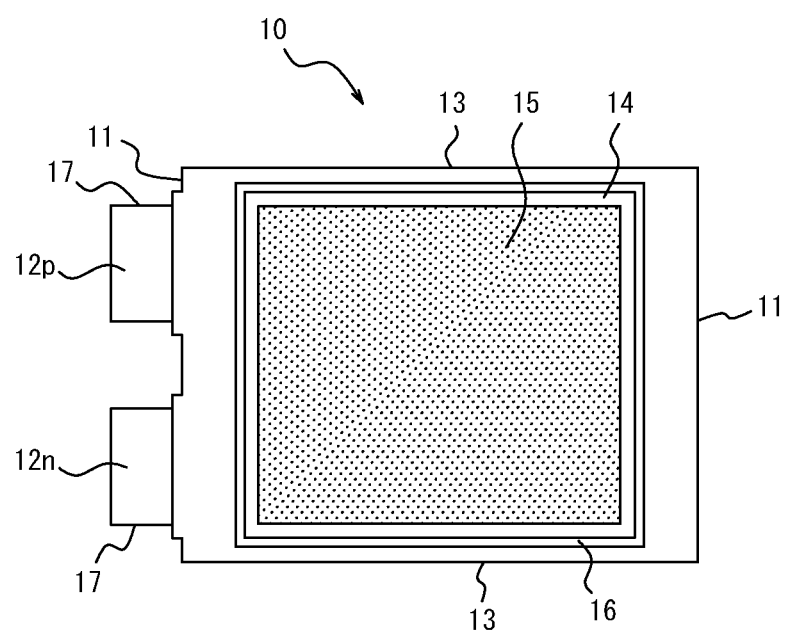
FIG. 9 illustrates only a battery cell of a battery pack according to a modification.
Figure 9:
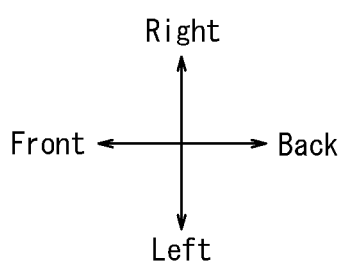

The electrode tabs 12p and 12n of the battery cells 10 have been described as protruding in opposite directions along the front-back direction but are not limited to this example. The electrode tabs 12p and 12n may be formed on the same surface. FIG. 9 illustrates only the battery cell 10 in a battery pack 1 according to a modification.

For example, as illustrated in FIG. 9, the front surface of the battery cell 10 protrudes one step farther outward in the central region of each of two halves aligned in the left-right direction than at the left and right edges. The front first outer surface 11 is formed so that two convex shapes are continuous in the left-right direction when viewed from the top. The electrode tabs 12p and 12n protrude forward from the two portions of the first outer surface 11 that protrude one step outward.

The first case 20 and the second case 30 may have any configuration that can house a stack of battery cells 10 like the one illustrated in FIG. 9. In particular, six battery cells 10 are stacked so that the positions of the electrode tabs 12p and 12n in the left-right direction differ between adjacent battery cells 10. Accordingly, the first case 20 and the second case 30 have a shape allowing six battery cells 10 stacked in this way to be housed appropriately.

For example, the first openings 24 for housing the pair of electrode tabs 12p and 12n can be formed together on a single front wall 22a in the first case 20. The number of steps for assembling the battery pack 1 can thereby be reduced. The battery pack 1 can contribute to improving productivity. The electrode tabs 12p and 12n of the battery cell 10 are formed only on the front first outer surface 11, leaving the back of the battery cell 10 flat. The front to back width of the battery cell 10 thus becomes shorter by an amount equal to the electrode tab 12p or 12n. The front to back width of the case therefore also becomes shorter, and the battery pack 1 can contribute to an overall reduction in size.

The first opening 24 has been described as being provided only in the first case 20, but this example is not limiting. It suffices for the first opening 24 to be provided in at least one of the first case 20 and the second case 30. When the first opening 24 is provided in both, a first opening 24 that extends across the entire stacked battery cells 10 may, for example, be formed by combining an opening in the first case 20 and an opening in the second case 30 from both the upper and lower sides while the surface S dividing the first case 20 and the second case 30 is arranged in the substantially central region of the battery pack 1.

The abutting portion 25 has been described as being provided only in the first case 20, but this example is not limiting. For example, the second case 30 may include an abutting portion. In this case, the abutting portion may be configured by the inner surfaces that correspond to the side surfaces 17 of the electrode tabs 12p and 12n of the battery cell 10. Both the first case 20 and the second case 30 may include an abutting portion.

Similarly, the insulating member 35 has been described as being fitted only into the first case 20, but this configuration is not limiting. For example, the insulating member 35 may be fitted into at least one of the first case 20 and the second case 30. In this case, at least one of the first case 20 and the second case 30 may include an engaging portion corresponding to the engaging portions 36 of the insulating member 35.

The number of battery cells 10 and the number of insulating members 35 are not limited to the above configurations. Any number of battery cells 10 may be included. The insulating members 35 may be provided in an appropriate form corresponding to the number of battery cells 10.

In the battery pack 1, the insulating sheet 50 and the restraining plate 60 may be provided at only one end in the up-down direction of the first case 20 and the second case 30. This can reduce the number of components and increase productivity of the battery pack 1.

REFERENCE SIGNS LIST

1 Battery pack
1a Body
10, 10a, 10b, 10c, 10d, 10e, 10f Battery cell
11 First outer surface
12p, 12n Electrode tab
13 Second outer surface
14 Third outer surface
15 Adhesive layer
16 Exterior member
17 Side surface
20 First case
20a Bottom surface
21 Screw hole
22a Front wall (wall)
22b Rear wall (wall)
22c Side wall
23 Housing portion
24 First opening (opening)
24a Inner surface
24b Outer surface
25 Abutting portion
26 Engaging portion
26a Engaging claw
30 Second case
31 Screw hole
32 Front wall
32a Second opening
35 Insulating member
35a Electrically insulating material
35b Metal material
36 Engaging portion
36a Engaging hole
37 Abutting portion
40 Bus bar
40a Total plus bus bar
40b Total minus bus bar
41a Insertion portion
41b Insertion portion
50 Insulating sheet
60 Restraining plate
61 Hole
70 Voltage detector
71 Terminal plate
72 Wire
80 Discharge portion
81 Discharge tube
E1 Engaging claw
E2 Engaging hole
O1, O2 Opening
S Surface

The invention claimed is:

1. A battery pack comprising:
a plurality of battery cells, each battery cell comprising a first outer surface having an electrode tab protruding therefrom and a second outer surface intersecting the first outer surface, the battery cells being stacked and connected in series with electrode tabs welded together;
a first case configured to surround the plurality of battery cells along the first outer surface and the second outer surface; and
an insulating member disposed between each adjacent electrode tab,
wherein the first case comprises a protrusion protruding from an outer wall of the first case in a protruding direction of the electrode tabs,
wherein the protrusion comprises an opening, exposing the electrode tabs, and an inner surface formed on the opening,
wherein the inner surface is configured to face a side surface of the electrode tabs exposed through the opening and is configured to regulate movement of the battery cell in a direction intersecting the protruding direction of the electrode tabs by abutting against the side surface of the electrode tabs, and
wherein the insulating member engages with an outer surface of the protrusion opposite the inner surface.

2. The battery pack of claim 1, wherein the electrode tabs of adjacent battery cells are welded together farther outward than the insulating member.

3. The battery pack of claim 2, wherein the insulating member is made of a resin material or a metal material provided with an electrically insulating material on a surface thereof.

4. The battery pack of claim 1, wherein the insulating member comprises an engaging portion configured to engage with the first case.

5. The battery pack of claim 1, wherein the first case comprises a wall configured to face the first outer surface of all of the battery cells and to regulate movement of the battery cells in the protruding direction by abutting against the first outer surface.

6. The battery pack of claim 1, further comprising:
a second case configured to sandwich the plurality of battery cells between the first case and the second case in a stacking direction of the battery cells,
wherein the first case and the second case fit together by an engaging claw provided on an exterior surface of one of the first case and the second case engaging with an engaging hole provided on a corresponding exterior surface of the other of the first case and the second case.

7. The battery pack of claim 6, wherein the first case and the second case are made of a resin material or a metal material provided with an electrically insulating material on a surface thereof.

8. The battery pack of claim 1, wherein the electrode tabs of adjacent battery cells among the plurality of battery cells are bent outside of the opening and welded.

9. A battery pack comprising:
a plurality of battery cells, each battery cell comprising a first outer surface having an electrode tab protruding therefrom and a second outer surface intersecting the first outer surface, the battery cells connected in series with electrode tabs welded together and stacked such that the battery pack includes a first end and a second end, wherein the first end and the second end each include n number of electrode tabs;
a case configured to surround the plurality of battery cells along the first outer surface and the second outer surface; and
insulating members disposed between the electrode tabs such that the first end of the battery pack and the second end of the battery pack each include insulating members number n−1,
wherein the case comprises a protrusion protruding from an outer wall of the case in a protruding direction of the electrode tabs,
wherein the protrusion comprises an opening, exposing the electrode tabs, and an inner surface formed on the opening,
wherein the inner surface is configured to face a side surface of the electrode tabs exposed through the opening and is configured to regulate movement of the battery cell in a direction intersecting the protruding direction of the electrode tabs by abutting against the side surface of the electrode tabs, and
wherein the insulating members engage with an outer surface of the protrusion opposite the inner surface.

10. The battery pack of claim 9, wherein the insulating member includes a body with a U-shaped configuration such that the insulating member spans the opening.

11. The battery pack of claim 9, further comprising an upper insulating sheet located at an upper end of the battery pack and a lower insulating sheet located at a lower end of the battery pack.

12. The battery pack of claim 11, further comprising an upper restraining plate and a lower restraining plate, wherein the upper restraining plate is fixed to the upper end of the battery pack such that the upper insulating sheet is located between the upper restraining plate and an uppermost battery cell and the lower restraining plate is fixed to the lower end of the battery pack such that the lower insulating sheet is located between the lower restraining plate and a lowermost battery cell.

13. The battery pack of claim 12, wherein the upper restraining plate and the lower restraining plate are each substantially flat in configuration.

14. The battery pack of claim 12, wherein the upper restraining plate and the lower restraining plate are each rigid in construction.

15. A battery pack comprising:
a plurality of battery cells, each battery cell comprising a first outer surface having an electrode tab protruding therefrom and a second outer surface intersecting the first outer surface, the battery cells being stacked and connected in series with electrode tabs welded together;
a body including a case configured to surround the plurality of battery cells along the first outer surface and the second outer surface; and
an insulating member disposed between the electrode tabs of adjacent battery cells,
wherein the case comprises a protrusion protruding from an outer wall of the case in a protruding direction of the electrode tabs,
wherein the protrusion comprises an opening, exposing the electrode tabs, and an inner surface formed on the opening,
wherein the inner surface is configured to face a side surface of the electrode tabs exposed through the opening and is configured to regulate movement of the battery cell in a direction intersecting the protruding direction of the electrode tabs by abutting against the side surface of the electrode tabs, and
wherein the insulating member includes a body with a U-shaped configuration such that the insulating member spans the opening.

16. The battery pack of claim 15, wherein the battery pack includes a first end and a second end each having n number of electrode tabs, the insulating members numbering n−1.

17. The battery pack of claim 15, wherein each battery cell includes a first electrode tab extending towards a first end of the battery pack and a second electrode tab extending towards a second end of the battery pack.

18. The battery pack of claim 17, further comprising a bus bar having a positive member and a negative member, the positive member being connected to the first electrode tab of an uppermost battery cell and the negative member being connected to the second electrode tab of a lowermost battery cell.

19. The battery pack of claim 15, further comprising a voltage detector connected to the body and each of the battery cells.

20. The battery pack of claim 19, wherein the voltage detector includes:
a plurality of terminal plates for detecting voltage in the battery cells; and
a wire connected to the terminal plates for transmitting voltage detected by the terminal plates.

* * * * *